(12) United States Patent
Boulton

(10) Patent No.: US 7,577,180 B2
(45) Date of Patent: Aug. 18, 2009

(54) METHOD AND SYSTEM FOR MAINTAINING SYNCHRONIZATION IN LOW-POWER MODE OVER A FREQUENCY HOPPING RADIO LINK

(75) Inventor: Philip A. Boulton, Vancouver (CA)

(73) Assignee: VTech Telecommunications Limited, Hong Kong (HK)

( * ) Notice: Subject to any disclaimer, the term of this patent is extended or adjusted under 35 U.S.C. 154(b) by 1013 days.

(21) Appl. No.: 10/737,879

(22) Filed: Dec. 18, 2003

(65) Prior Publication Data
US 2005/0136882 A1 Jun. 23, 2005

(51) Int. Cl.
*H04B 1/69* (2006.01)
*H04B 1/707* (2006.01)

(52) U.S. Cl. .......................... 375/133; 375/141; 375/324

(58) Field of Classification Search .................. 375/132, 375/133, 135, 136, 140, 141, 144–148, 220, 375/354, 356, 358, 362, 364, 369, 375, 240.28; 370/331; 455/343.4
See application file for complete search history.

(56) References Cited

U.S. PATENT DOCUMENTS

| | | | | |
|---|---|---|---|---|
| 4,677,617 | A | * | 6/1987 | O'Connor et al. ........... 370/478 |
| 4,807,248 | A | * | 2/1989 | Pyatt et al. .................. 375/366 |
| 5,353,341 | A | * | 10/1994 | Gillis et al. ................. 455/464 |
| 5,940,431 | A | | 8/1999 | Haartsen et al. |
| 2003/0128741 | A1 | * | 7/2003 | Chun .......................... 375/132 |
| 2003/0142764 | A1 | * | 7/2003 | Keevill et al. ............... 375/341 |

FOREIGN PATENT DOCUMENTS

GB 2260882 4/1993

OTHER PUBLICATIONS http://www.swedetrack.com/images/blue11.htm "Bluetooth: What's the Advantage of Frequency Hopping".
Bluetooth Specification Version 1.1, Physical Channel, Feb. 22, 2001, pp. 43-44.
Bluetooth Specification Version 1.1, Transmit Receive TIming, Feb. 22, 2001, pp. 84-90.
Bluetooth Specification Version 1.1, Channel Control, Feb. 22, 2001, pp. 110-118.
GB Search Report Dated Apr. 5, 2006.

* cited by examiner

*Primary Examiner*—Chieh M Fan
*Assistant Examiner*—Qutbuddin Ghulamali
(74) *Attorney, Agent, or Firm*—Paul, Hastings, Janofsky & Walker LLP

(57) ABSTRACT

Systems and methods for maintaining synchronization of a base unit and a portable unit in a low-power mode are provided. The base unit and the portable unit communicate with each other via wireless frequency hopping radio communications links. The base unit and the portable unit switch to a synchronization state in a synchronization period during the low-power mode. During the synchronization period, the base unit transmits one of a first and a second link synchronization messages. The portable unit is required to respond to the second link synchronization. If the base unit receives a response from the portable unit within a predetermined number of periods, the base unit and the portable unit switch back to the low-power mode. Otherwise, the base unit and the portable unit are switched to a SEARCH state to search for a synchronized communications channel.

20 Claims, 9 Drawing Sheets

Resynchronization is sucessful after the first attempt in period marked with 11

METHOD AND SYSTEM FOR MAINTAINING SYNCHRONIZATION IN LOW-POWER MODE OVER A FREQUENCY HOPPING RADIO LINK

BACKGROUND

1. Field of the Invention

The present invention relates generally to spread spectrum communications between two communications devices, and more particularly, to a method and system for maintaining synchronization between such communications devices in a power-conserving mode.

2. Background of the Invention

Nowadays spread spectrum communications that employ frequency hopping are widely used in a variety of communications systems for communicating between two or more communication devices, such as between a base unit and a portable unit (e.g., handset or headset) of a cordless telephone system. To provide proper communication, the operations of such units must be time-synchronized to each other.

For example, with reference to FIG. 1, cordless telephone system 100 includes base unit 10 and one or more portable units 20. Base unit 10 is a landline telephone base station associated with telephone line 30 of Public Switch Telephone Network (PSTN) 40. Portable unit 20 is a remote unit that communicates with base unit 10 via known wireless communications technology. To allow communication between portable unit 20 and base unit 10, portable unit 20 and base unit 10 each have radio transmitters 21, 11, receivers 22, 12, and antennas 23, 13, respectively, to exchange signals. Typically, portable unit 20 includes rechargeable battery 24 that is charged when portable unit 20 is placed in cradle 15 located in base unit 10. Base unit 10 is powered by current from an alternating current ("AC") outlet (e.g., of a house, office, etc.). Cradle 15 need not be co-located with base unit 10. In models in which base unit 10 has no cradle, a separate cradle unit can be used to charge the battery of portable unit 20.

In operation, receiver 22 of portable unit 20 is normally kept in a full-power mode when using telephone system 100 to originate and receive calls. When a user wishes to place a call from portable unit 20 and dials a telephone number of a called party, transmitter 21 of portable unit 20 sends a signal to base unit 10. Upon receiving the signal from portable unit 20, base unit 10 seizes telephone line 30, through which the user can communicate with the called party. Similarly, when base unit 10 receives an incoming call, base unit 10 transmits an appropriate ringing signal to portable unit 20, thereby activating a ringer in portable unit 20.

As battery 24 provides limited power, the period of time for reliable operation of portable unit 20 is limited. To extend the reliable operating time, it is required that portable unit 20 be able to go into a low-power or standby mode with minimal power consumption when it is not in use. In some cases, portable unit 20 further goes into a sleep mode after a period of time during the lower-power mode and wakes up periodically for detecting any incoming signals. If no signal is detected, portable unit 20 goes back to the sleeping mode until next cycle is started or when any incoming signals are detected.

It is also necessary for the link between portable unit 20 and base unit 10 be re-established promptly when there is a stimulus at either end of the link. An example of such a stimulus on portable unit 20 side would be a telephone keypress. An example on base unit 10 side would be an incoming call (i.e., ringing). It is also required that if the link is disrupted in the low power mode, for example, when changing battery 24 of portable unit 20, this condition be detected at both ends of the link, and that base unit 10 and portable unit 20 perform a link search to re-establish the link.

Conventionally, cordless telephone system 100 initiates communications over one of multiple channels and continues to use the same channel for ongoing communications between portable unit 20 and base unit 10. This type of cordless telephone system employs fixed-frequency RF (radio frequency) link between portable unit 20 and base unit 10. With recent rulings promulgated by the Federal Communications Commission, spread spectrum systems, including frequency hopping systems, are also used in some cordless telephone system. A frequency hopping system changes the frequency of the transmission many times in a second in accordance with a pseudo randomly generated list of channels. The frequency hopping system allows for an increased spectral utilization.

It, however, causes problems if simply using the old architecture to employ the frequency hopping system. Most notably, frequency hopping links are sensitive to timing differences. For a fixed-channel link, a transmission on one side of the link is always received by the RF link on the other side. With a frequency hopping link, as the channel changes with time, a unit expecting to receive a message from its partner must be tuned to the same channel on which its partner is transmitting to enable receipt of the transmission.

In addition, the method used to implement the RF standby mode should be compliant with any relevant regulations for frequency-hopping devices, and should be robust even if several of the RF channels in the hop sequence are unusable due to interference.

BRIEF SUMMARY OF THE INVENTION

One object of the present invention is to maintain synchronization between two wireless communications devices in a frequency-hopping radio link in a power-conserving mode. The present invention allows that the detection of link loss due to, for example, a long range, is tolerant of interference on some of the channels used. Further, the invention allows that a full-power frequency-hopping link can be re-established promptly when required.

In accordance with an embodiment of the present invention, a method for maintaining synchronization of a base unit and a portable unit in a standby mode over a frequency-hopping radio link is provided. The method includes the step of transiting the base unit and the portable unit to a resynchronization state during the standby mode in a resynchronization period. The resynchronization period is a product of a positive number and a period of time of frequency hopping on each channel of multiple communication channels that are used by the base unit and the portable unit for communications. During every synchronization period, the method includes the step of transmitting at least one link synchronization message from the base unit to the portable unit. The method then provides the step of adjusting a timing clock of the portable unit based on the at least one synchronization message received from the base unit. The next step of the method is responding to the at least one link synchronization message if required by the base unit. After receiving the response to the at least one link synchronization message, the method includes the step of transiting the base unit and the portable unit from the resynchronization state to a low-power state.

An exemplary system of the invention includes a base unit and a portable unit that communicate with each other via a wireless frequency hopping communications radio link. In accordance with the exemplary system, the base unit and the portable unit each includes a processor for switching the base unit and the portable unit to a synchronization state in a synchronization period. The processor of the portable unit also sends wakeup signals to the portable unit when a time for the portable unit to switch to a resynchronization state arrives. A first transmitter located in the base unit is used to transmit a link synchronization message to the portable unit during the synchronization period. A second transmitter located in the portable unit is used to send a link synchronization reply message to the base unit if required by the base unit. The processors switch the base unit and the portable unit to a low-power state if the base unit receives the link synchronization reply message within X synchronization periods, wherein X is an integer that is greater than 1.

In accordance with a further embodiment of the present invention, a communications system includes a base unit coupled to a telephone line, a portable unit communicating with the base unit via a frequency hopping radio link, a first microprocessor coupled to the base unit, and a second processor coupled to the portable unit. The base unit includes a first transmitter and a first receiver. The portable unit includes a second transmitter and a second receiver. The microprocessors switch the base unit and the portable unit from a full-power mode to a standby mode when the base unit and portable unit are not in communication for a predetermined period of time. The microprocessors further switch the base unit and the portable unit to a synchronization state in a synchronization period during the standby mode. During the synchronization state, the first transmitter of the base unit transmitting one of a first link synchronization message and a second link synchronization message to the portable unit. The second link synchronization message requires a response from the portable unit. Upon receiving the second synchronization message, the second transmitter of the portable unit transmits a link synchronization reply message to the base unit. If the base unit receives the link synchronization reply message, the microprocessors switch the base unit and the portable unit to a low-power state.

DETAILED DESCRIPTION OF THE INVENTION

Figure 1:
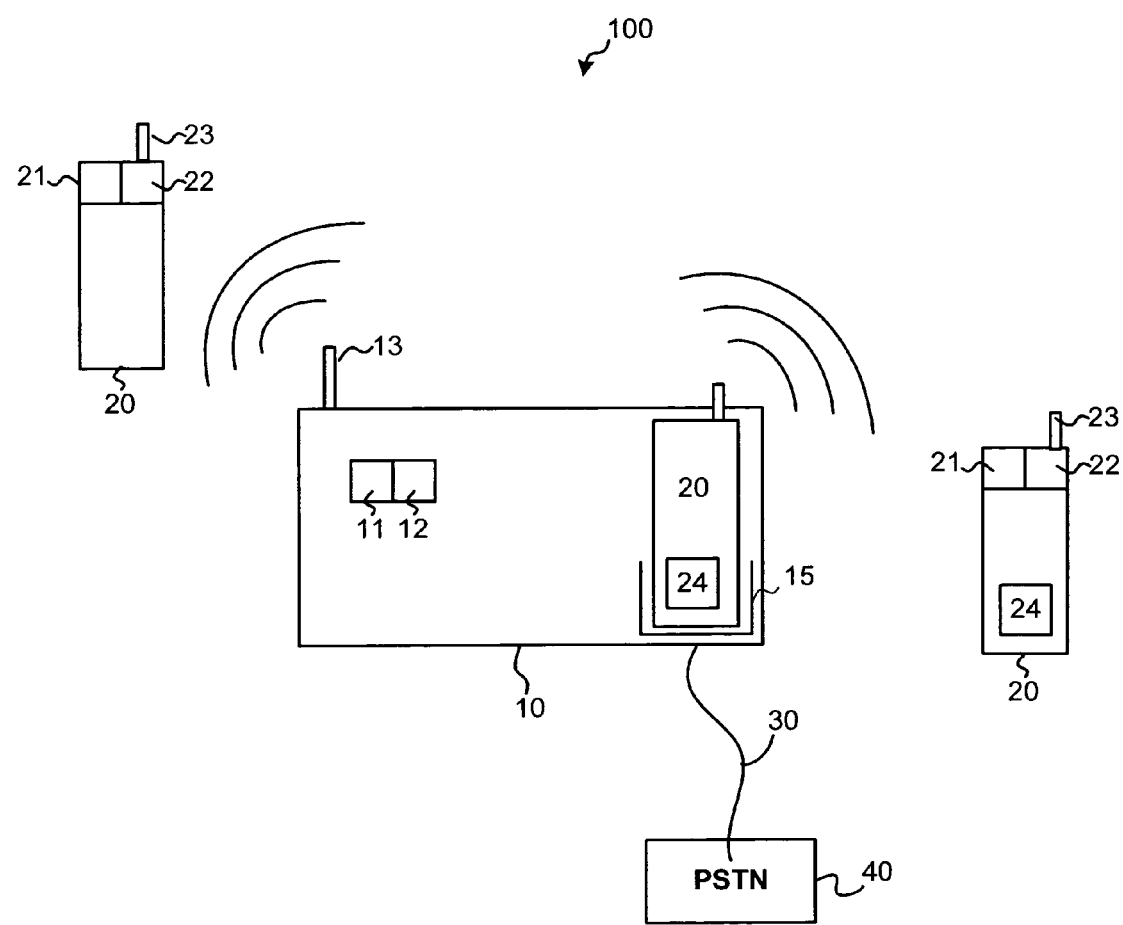
FIG. 1 is a schematic diagram of a cordless telephone system that can be configured to implement the present invention.

The present invention provides a method for maintaining synchronization in a low-power mode between a portable unit and a base unit of a cordless telephone system that communicates over a frequency-hopping radio link. Cordless telephone system 100 as shown in FIG. 1, which includes base unit 10 and one or more portable units 20, is configured to operate in accordance with a method of the present invention. Both base unit 10 and portable unit 20 are capable of receiving and transmitting data, such as data packets.

Over a frequency-hopping radio link in a full-power mode, each of base unit 10 and portable unit 20 transmits and receives signals in a hop sequence for a fixed period of time ($T_{hop}$) on each channel of a pseudo randomly generated list of channels. Each of base unit 10 and portable unit 20 then switches synchronously to the next channel in the hop sequence. To ensure that base unit 10 and portable unit 20 operate synchronously, base unit 10 is configured as a timing master for the radio link and portable unit 20 is configured as a timing slave that adjusts its hopping rate to be consistent with that of base unit 10. Base unit 10 should also allow its clock to be adjusted based on a bit clock received from portable unit 20. With the full-power link in both directions, the state of each unit is hereinafter referred to as the TRACK state.

Once both units 10 and 20 enter the TRACK state, channel and bit timing synchronization are achieved in both directions across the link. To conserve power and spectrum usage, if no communication occurs between units 10 and 20 within a predetermined amount of time, base unit 10 and portable unit 20 enter from their TRACK state into a standby mode. In the standby mode, portable unit 20 can further enter into a low-power mode, in which transmitter 21 and receiver 22 of portable unit 20 are idle until portable unit 20 is activated by a stimulus. The stimulus can be received from either portable unit 20 itself, if portable unit 20 is turned on, or base unit 10. A stimulus from base unit 10 may involve a ringing signal indicating an incoming call. A stimulus from portable unit 20 may involve a key-press signal due to user intervention. With respect to a stimulus like incoming ringing, portable unit 20 can only receive that stimulus if portable unit 20 is receiving data via RF from base unit 10. To control entry into the link standby mode, base unit 10 and portable unit 20 can be designed to have same logic, protocol, message exchange or implicit synchronization that results in both units entering a standby mode at about the same time. As with any such synchronization across a link, it is possible for one unit to go through with the entry into standby mode, while the other does not. Choosing a standard entry protocol/logic is possible to make this happened less frequently, but it cannot completely eliminate the possibility. There are other factors influencing the synchronization between the portable unit and the base unit, such as signal interference, frequency differences, system clock drifts and so on. Accordingly, it is important to maintain synchronization during a low-power mode between portable unit 20 and base unit 10 and to establish a resynchronization when the synchronization between these two units is lost.

Figure 2:
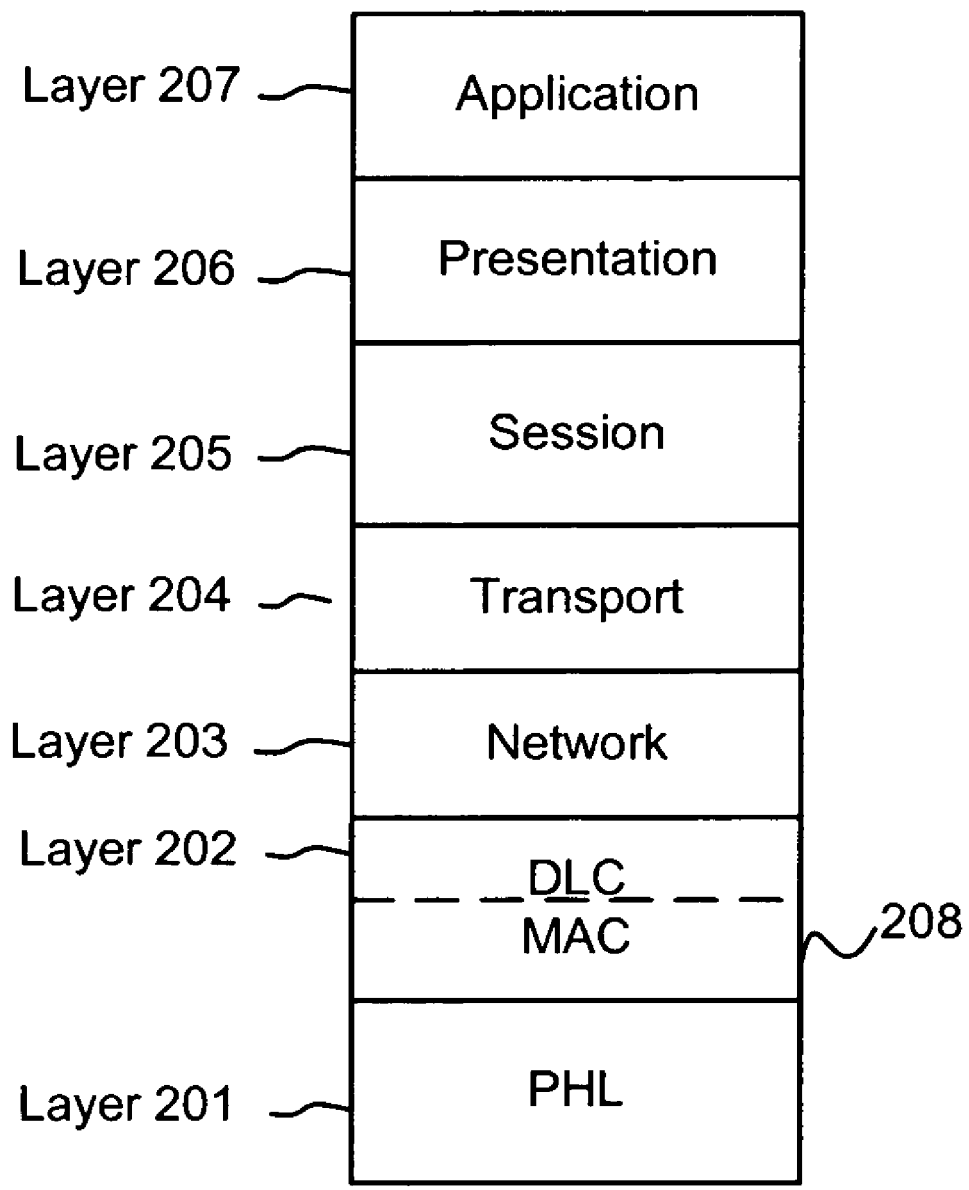
FIG. 2 is a block diagram showing an exemplary Open System Interconnection (OSI) 7-layer protocol employed for maintaining synchronization and resynchronization in an exemplary cordless telephone system of the present invention.

The protocol employed for maintaining the synchronization and resynchronization in the cordless telephone system in accordance with the present invention follows a standard OSI (Open System Interconnection) layer model as shown in FIG. 2. Model 200 includes PHL (physical link) layer 201, DLC (Data link) layer 202, Network link layer 203, Transport link layer 204, Session link layer 205, Presentation link layer 206, and Application link layer 207. In accordance with the present invention, however, only PHL 201 and DLC 202 are involved in establishing resynchronization between base unit 10 and portable unit 20. DLC 202 further includes MAC (Medium Access Control) layer 208 that is a lower half of DLC layer 202. In the following description, only PHL layer 201, DLC layer 202, and MAC layer 208 will be explained. Furthermore, for the purpose of explanation, DLC layer 202 and MAC Layer 208 will be described herein as separate layers even if MAC layer 208 is the lower half of DLC layer 202.

PHL layer 201 provides physical channels to its upper layer, such as MAC layer 208, and is responsible for locking a timing clock of portable unit 20 to a SYNC clock that is sent by base unit 10 in, for example, every 10 ms frame. PHL layer 201 also reports the state of synchronization to MAC layer 208.

MAC layer 208 provides logical channels to its upper layer, DLC layer 202, so that DLC layer 202 does not have to be concerned with the frame size, channel association, maintenance, and error control issues. MAC layer 208 also provides high-level state synchronization between base unit 10 and portable unit 20. In accordance with the present invention, the synchronization between portable unit 20 and base unit 10 is controlled and managed by MAC layer 208.

DLC layer 202 provides very reliable data links to the higher layers to support critical data/command file transmission. Via DLC layer 202, error correction based on re-transmission can be implemented. DLC layer 202 also provides unacknowledged data links to the higher layers to support non-critical data file transmission. The size of the data file is flexible.

In accordance with the protocol of the invention, all interface invocations are built on a real time scheduler so that each software program can be executed without interruption by other programs. The protocol also provides very reliable data links to the higher layers to support data/command transmission, and provides a special data link to the layer with highest priority in a way such that the protocol suspends all other transmissions until the execution of the special data link is done. The special data link can be used to carry caller ID information. Furthermore, the protocol of the invention provides Synchronization Continuous Bitstream Orientated (SCBO) data links to support audio transmissions. By employing the protocol, cordless telephone system 100 of the present invention can transmit and receive signals in a frequency hopping manner. System 100 also has the advantages of adaptive channel replacement. Furthermore, system 100 can dynamically enable/disable the frequency diversity, vary propagation delay between base unit 10 and portable unit 20, and so on. Furthermore, the protocol of the present invention provides cordless telephone system 100 with an active mode for normal operations and a standby mode to save battery power of portable unit 20. The protocol also facilitates to link cordless telephone system 100 to a SEARCH state when telephone system 100 is powered up or loses a link, and to a RESYNC state from its standby/sleep mode. The details of these functions of the protocol are further described below.

There are at least two synchronization aspects associated with the present invention. The first aspect involves a synchronization of frame ("frame synchronization") in portable unit 20 and base unit 10. The second aspect involves a synchronization of timing at the bit level ("bit-level synchronization"). In accordance with the present invention, the frame synchronization in portable unit 20 and base unit 10 can be performed by software, such as MAC layer 202. The synchronization of timing at the bit level can be performed by software such as PHL layer 201, or hardware. In general, the bit-level synchronization is achieved before the frame synchronization.

Figure 3:
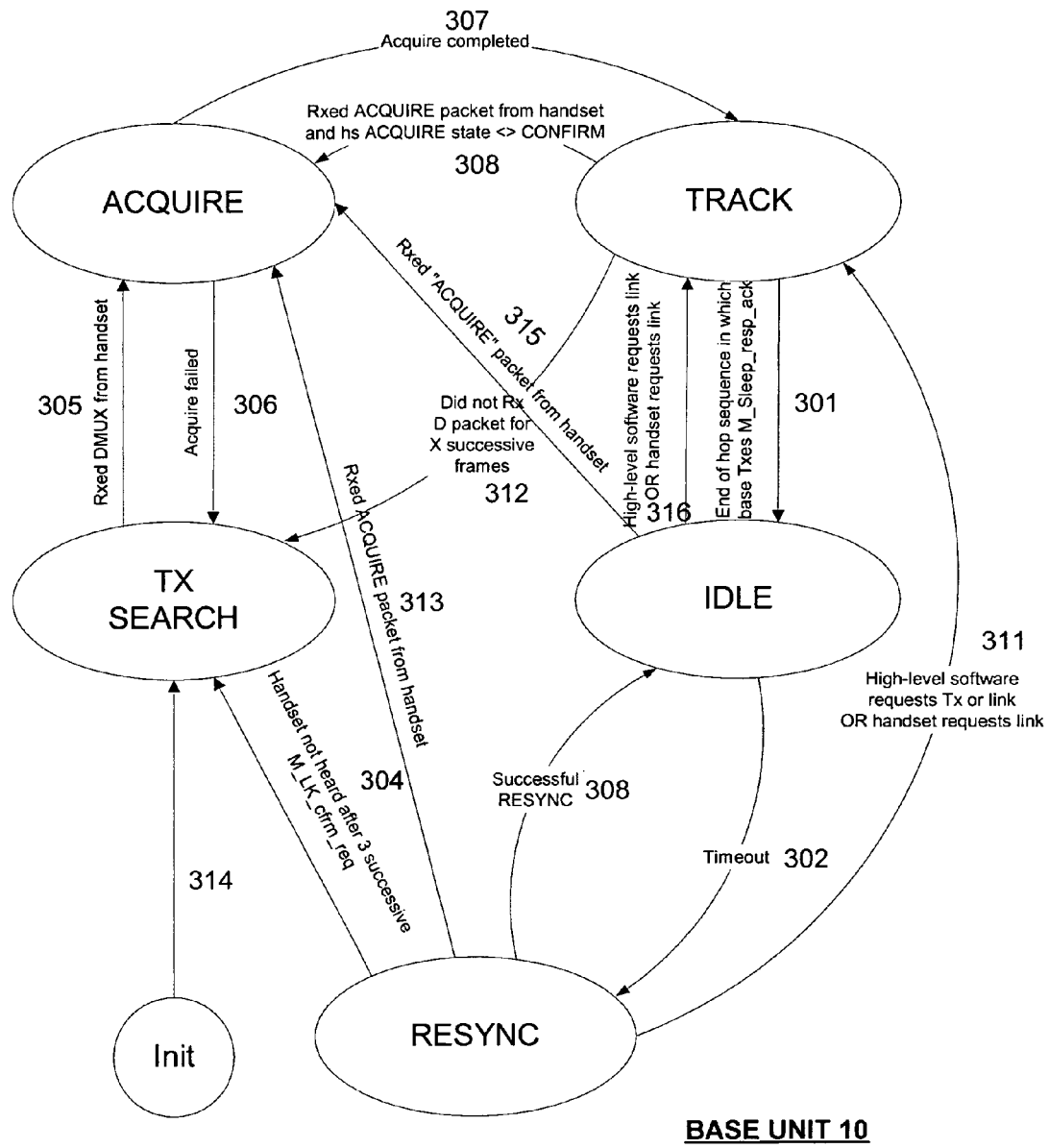
FIG. 3 is a schematic diagram showing MAC states and their relationships with a base unit of the exemplary cordless telephone system of the present invention.
Figure 4:
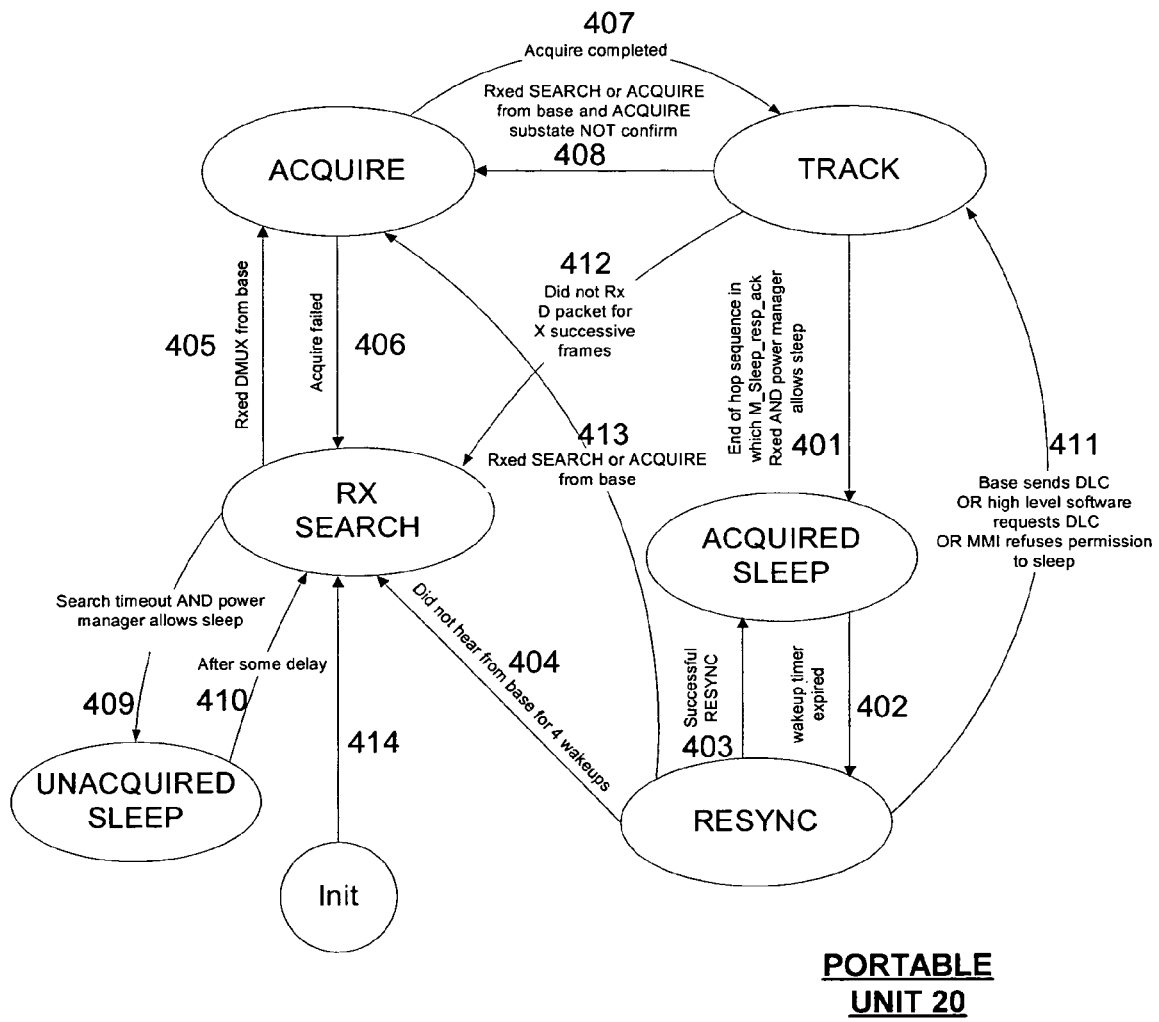
FIG. 4 is a schematic diagram showing MAC states and their relationships with a portable unit of the exemplary cordless telephone system of the present invention.

FIGS. 3 and 4 represent exemplary MAC state machines and their state relationships with base unit 10 and portable unit 20, respectively. As shown in these figures, base unit 10 may include five states: TRACK, IDLE, RESYNC, TX SEARCH, and ACQUIRE. Portable unit 20 may include six working states:

TRACK, ACQUIRED SLEEP, RESYNC, RX SEARCH, ACQUIRE, and UNACQUIRED SLEEP. Base unit 10 receives and transmits data in all states except during the IDLE state.

As base unit 10 is the timing-frame master in all of the states, no timing adjustment is needed for base unit 10. Portable unit 20 that serves as the timing-frame slave must adjust its framing timing to lock on the base unit timing. The timing frame used in the present invention may be, for example, 10 ms.

As mentioned before, when cordless telephone system 100 is being used for placing or receiving a call, both of base unit 10 and portable unit 20 are at the TRACK state and cordless telephone system 100 is at the full-power mode. During the TRACK state, base unit 10 and portable unit 20 transmit and receive signals in a hopping sequence for a fixed period of time $T_{hop}$ on each channel, and then switch to next channel synchronously. In accordance with the present invention, there are at least two types of hopping patterns utilized for communications between portable unit 20 and base unit 10. The first hopping pattern is "current pattern" that is used in all states except the SEARCH and ACQUIRE states. The second hopping pattern is "pattern 0" that is derived from a base unit ID and is used in the SEARCH state. In an alternative embodiment, the second pattern can be also used in other states, as long as there is no need for a change in the frequency channel assignment.

The "current pattern" is the same as the "pattern 0" when cordless telephone system 100 powers up or when the link between portable unit 20 and base unit 10 is re-established. However, it is modified by adaptive channel replacement algorithm during the TRACK state. The "current pattern" has a dwell time of, for example, 10 ms/channel in all states where it is used. In some states, the transmitter and/or receiver are powered down, but the hop counter still changes every 10 ms in these states.

When cordless telephone system 100 is not being used (e.g., on-hooked) for a preset period of time, cordless telephone system 100 enters into a standby mode. In the standby mode, base unit 10 and portable unit 20 switch into the low-power mode by switching from their TRACK states to the IDLE state and ACQUIRED SLEEP state, respectively. Before entering the standby mode, portable unit 20 first checks its power manager whether it may enter into the SLEEP state. Once it is allowed to do so, portable unit 20 sends a Sleep_req message to base unit 10 at the end of a hopping sequence. In response to this message, base unit 10 returns a Sleep_Ack message to acknowledge this message, if base unit 10 no longer requires an active RF link. After portable unit 20 receives the Sleep_Ack message from base unit 10, base unit 10 and portable unit 20 enter into the IDLE state and the ACQUIRED SLEEP state, respectively, as shown by arrow 301 of FIG. 3 and arrow 401 of FIG. 4. After that, the power manager sets cordless telephone system 100 to a low-power mode. In a preferred embodiment of the present invention, the power manager is controlled by MAC layer 208.

As shown in FIG. 4, there are two SLEEP states in portable unit 20: UNACQUIRED SLEEP state and ACQUIRE SLEEP state. Most of the functionalities of these two SLEEP states are the same, and the differences are in transitions and in timing out settings. The ACQUIRED SLEEP state is a state that portable unit 20 enters from the TRACK state when cordless telephone system 100 enters into the standby mode, as shown by arrow 401. During this state, portable unit 20 wakes up at a pre-determined period of time to execute synchronization and resynchronization process with base unit 10. The UNACQUIRED SLEEP state is introduced to prolong the life of battery 24 of portable unit 20. Portable unit 20 enters into the UNACQUIRED SLEEP when a search performed at the SEARCH state runs out of time, as shown by arrow 409. As is it entering into the SLEEP state, portable unit 20 enters into the UNACQUIRED SLEEP when the search time at its SEARCH state is timeout and the power manager controlled by MAC layer 202 gives a permission to sleep. The power manager may not give permission to sleep for any numbers of reasons, for example, if a user is actively programming a phone number into portable unit 20, or some such interaction. In a normal condition, the search time at the SEARCH state is less than about 200 ms. Even after entering into the UNACQUIRED SLEEP state, portable unit 20 still wakes up after a predetermined period of time to continue the SEARCH state, as shown by arrow 410, until a synchronized communication channel is found. The details regarding the SEARCH state are described below.

Again referring to FIG. 3, in the IDLE state, base unit 10 may turn off its transmitter 11 and/or receiver 12 (see FIG. 1) and is not expected to receive any transmission, except immediately after the RESYNC state, but still keep track of the changes in the RF channel every $T_{hop}$, so that it continues "logically hopping" in the same hop sequence as it does in the TRACK state. Similarly, in FIG. 4, portable unit 20 in the ACQUIRED SLEEP mode is not communicating with base unit 10 and both its transmitter 21 and receiver 22 (see FIG. 1) are turned off. As during the handset ACQUIRED SLEEP state and base IDLE state, portable unit 20 and base unit 10 are not communicating with each other, the clock drifts at a crystal level, resulting in a complete lost of synchronization. Therefore, portable unit 20 needs to adjust its clock in a regular basis to be synchronized with base unit 10 during the low-power mode.

Portable unit 20 and base unit 10 enter into their RESYNC states when their wakeup timers expire, as shown by arrow 402 of FIG. 4 and arrow 302 of FIG. 3. The wakeup timer of base unit 10 is designed to be approximate to that of portable unit 20 so that they can be woken up almost at the same time. The RESYNC state re-establishes and adjusts its timing clock once every RESYNC period (if successfully), and permits portable unit 20 to request/force a transition to the TRACK state if a link is required. As will be described with reference to FIG. 5, at the start of the RESYNC state, the frame and bit timing of portable unit 20 are not synchronized with those of base unit 10. At the end, portable unit 20 would have managed to synchronize its timing during the RESYNC state. In this case, the synchronization between portable unit 20 and base unit 10 is completed successfully. Portable unit 20 is then switched back to its ACQUIRE SLEEP state until next wake-up timer arrives, as shown by arrow 403. Similarly, base unit 10 is switched back to its IDLE state, as shown by arrow 303. Normally, base unit 10 and portable unit 20 switch to the RESYNC state about every second (i.e., about every 100 frames).

Details of the resynchronization at the RESYNC state are described below with reference to FIG. 5. Briefly speaking, at the RESYNC state, if portable unit 20 fails to receive or "hear" any response from base unit 10 after several wake-ups (i.e., portable unit 20 fails to adjust its timing clock with that of base unit 10), both portable unit 20 and base unit 10 are forced to leave their standby mode and enter into SEARCH state for searching for a synchronized communication channel, as shown by arrows 304 and 404. In accordance with a preferred embodiment of the invention, whenever portable unit 20 fails to synchronize with base unit 10 during the RESYNC sate and therefore proceeds a channel-searching and/or message-acquiring steps at the SEARCH state and/or ACQUIRE state, cordless telephone system 100 switches back to the TRACK state and enters into the full-power mode. Furthermore, when cordless telephone system 100 is powered up, base unit 10 and portable unit 20 first enter the SEARCH state for searching for a synchronized communication channel, and then enter into the TRACK state when the synchronized communication channel is found, as shown by arrows 314 and 414. Base unit 10 and portable unit 20 can also enter into the SEARCH state from their TRACK state, as shown by arrows 312 and 412, when portable unit 20 somehow loses its synchronization with base unit 10 during the TRACK state.

In one embodiment of the present invention, while in the SEARCH state, base unit 10 may transmit a beacon signal, which is a DMUX frame with a message Link_Search/hop_index_number. The DMUX frame can be a pure data packet. Reception of a DMUX packet by either base unit 10 or portable unit 20 indicates that the receiving unit is able to successfully decode the transmission of its partner, and that a link acquisition should be attempted. For example, the DMUX packet shown by arrow 305 of FIG. 3 and arrow 405 of FIG. 4 renders a transition from the SEARCH to the ACQUIRE state. Transmitting the hop index allows portable unit 20 to adjust its hop index in the event that portable unit 20 decodes that base unit 10 is searching on an adjacent channel. As base unit 10 is the frame-timing master, in the SEARCH state, the hardware of base unit 10 does not change the 10 ms frame timing. As to portable unit 20, its hardware searches for a base SYNC word in the DMUX format. The base SYNC word may have, for example, about 24 bits. If the base SYNC word is found, the receiver frame structure of portable unit 20 is shifted to be in alignment with the incoming base frames and the subsequent data stream is decoded. In accordance with a preferred embodiment of the present invention, a correct CRC (Cyclic Redundancy Check) can be used to verify that the incoming data stream is from the correct base unit. Base unit 10 can also transmit its ID with each data packet. In this manner, portable unit 20 recognizes whether the incoming data stream is from the correct base unit. Furthermore, in the SEARCH state, both base unit 10 and portable unit 20 use hop pattern 0, which, as mentioned above, is different from a normal hop pattern ("current pattern") used in other states.

If the search for a synchronization communication channel in the SEARCH state is successful, that is, when portable unit 20 receives a valid frame from base unit 10, and base unit 10 also receives some valid DMUX frames from portable unit 20, both base unit 10 and portable unit 20 enter into their ACQUIRE states, as shown by arrows 305 and 405. There are a number of ways for base unit 10 and portable unit 20 to enter into the ACQUIRE state. For example, in FIG. 3, as shown by arrow 305, base unit 10 enters the ACQUIRE state from the SEARCH state upon receiving a DMUX from portable unit 20. Base unit 10 can also enter into the ACQUIRE state from the RESYNC state and the IDLE state when base unit 10 receives a ACQUIRE packet from handset 20, as shown by arrows 313 and 315, respectively. Similarly, in FIG. 4, as shown by arrow 405, portable unit 20 enters the ACQUIRE state from the SEARCH state upon receiving a DMUX from base unit 10. Portable unit 20 can also enter the ACQUIRE state from the TRACK state when it receives a SEARCH or an ACQUIRE packet from base unit 10, as shown by arrow 408, unless the ACQUIRE packet received corresponds to a final ACQUIRE sub-state of portable unit 20. Furthermore, as shown by arrow 413, portable unit 20 can enter ACQUIRE state from the RESYNC state upon receiving a SEARCH or an ACQUIRE packet from base unit 10.

In the ACQUIRE state, base unit 10 transmits ACQUIRE state packets within a DMUX frame. Portable unit 20 needs to match the base SYNC word received in the ACQUIRE state packets, and to adjust its frame timing so that it can be aligned with the base frame timing. Both portable unit 20 and base unit 10 enter the ACQUIRE state after the SEARCH process to synchronize their entry into the TRACK state. If the process in the ACQUIRE state succeeds, base unit 10 and portable unit 20 enter into the TRACK state, as shown by arrows 307, 308 and 407. Otherwise, i.e., if the ACQUIRE process fails, portable unit 20 and base unit 10 go through the ACQUIRE state to the SEARCH state rather than to the TRACK state. That is, base unit 10 and portable unit 20 need to execute another search, as shown by arrows 306 and 406, until the search is successfully done.

For both base unit 10 and portable unit 20, the ACQUIRE state is broken up into sub-states (not shown), which are basically stages in the negotiation/co-ordination of entry into the TRACK state. Indication of that sub-state is transmitted as part of the ACQUIRE packets. On both sides, the last sub-state of the ACQUIRE process is CONFIRM. The reason that state transitions from TRACK to ACQUIRE check whether the other unit's sub-state is CONFIRM is that in a successful ACQUIRE to TRACK transition, it is not necessary for both units to transition at the same time. They both go through individual link acquisition/quality confirmation processes. If, for example, base unit 10 has just entered the TRACK state, and portable unit 20 is still in the ACQUIRE state, it does not make sense for base unit 10 to bounce back into the ACQUIRE state and repeat the acquisition process. Hence, base unit 10 would not do a state transition to the ACQUIRE state when base unit 10 receives an ACQUIRE + confirm packet from portable unit 20. However, base unit 10 would do the transition if it receives a packet showing that the portion unit 20 is at an earlier stage of acquisition.

In some cases, during the standby mode, in addition to being woken up by the wake-up timer every normal synchronization period, portable unit 20 can also initiate a wake-up command Link_Wakeup at the RESYNC state to establish a link with base unit 10. The wake-up command can be originated by a stimulus occurring at portable unit 20, such as when portable unit 20 is off-hooked, and when a telephone call is initiated locally. Furthermore, portable unit 20 can also issue the wake-up command to base unit 10 when handset high-level software (MMI) requests a transmission or refuses permission to sleep. The transmission request or permission refusal sent by the MMI can be resulted from the facts that, for example, portable unit 20 is off-hooked or a telephone call is initiated locally. In the example of a local call being initiated at portable unit 20 by a phone keypress, the MMI requests call setup transmissions to base unit 10, and the power manager refuses the sleep permission because the call setup is in progress. Portable unit 20 link does not respond directly to "off-hook actions" because it does not know about them. However, in the course of call setup, the MMI will request transmissions, and the power manager will be told that it cannot allow portable unit 20 to sleep. The MMI and the power manager interact directly with portable unit 20 RF link. After receiving the wake-up call from portable unit 20, portable unit 20 switches from the RESYNC state to the TRACK state, as shown by arrow 411, and base unit 10 also switches from the RESYNC state to the TRACK state, as shown by arrow 311. The wake-up command can also be initiated by base unit 10 to portable unit 20, which can happen when a ringing signal is initiated at base unit 10. Furthermore, the wake-up commands can be initiated during the IDLE state when portable unit 20 initiates a Link_Request commands as a stimulus is occurred, or by a high-level software request link commands, which is shown by arrow 316.

Figure 5:
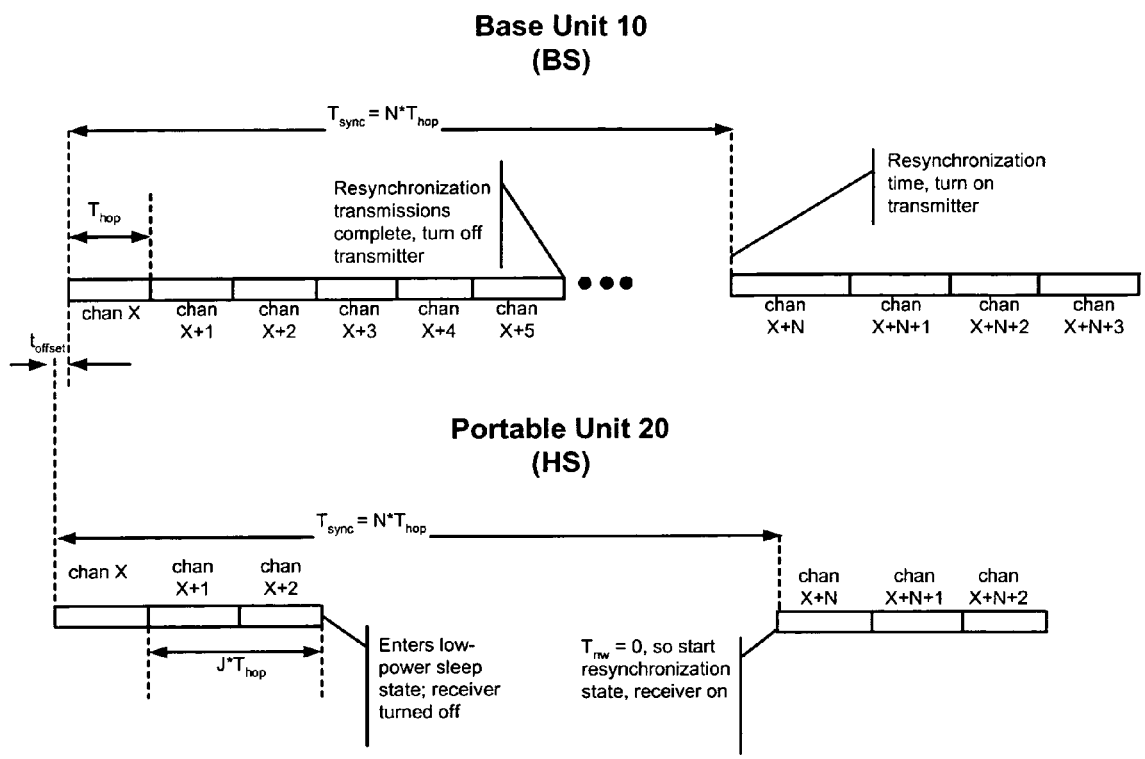
FIG. 5 is a schematic diagram showing a timing relationship for base unit 10 and portable unit 20 resynchronization in accordance with the present invention when both of the units enter into a standby mode.

FIG. 5 is a diagram showing a timing relationship for base unit 10 and portable unit 20 resynchronization in accordance with the present invention when both of the units enter into the standby mode. As mentioned above, base unit 10 and portable unit 20 both enter into the RESYNC state when a resynchronization step is to be executed.

To carry out the idle mode transmission, both base unit 10 and portable unit 20 switch to the RESYNC state every a predetermined period of time, for example, about 1 second. In the base unit RESYNC state, base unit 10 periodically transmits link synchronization messages that includes Link_Check_req commands to portable unit 20. The Link_Check_req commands do not require a response from portable unit 20. When receiving the Link_Check_req command, portable unit 20 simply takes the opportunity to lock on base unit 10 again and adjusts its frame timing clock. The link synchronization messages are sent with a period $T_{sync}$ for a fixed or variable amount of time. That is, the beginning of each transmission should be occurred with $T_{sync}$, and the duration of each transmission session may be the same or it may vary. In accordance with the present invention, during each transmission session, at least one synchronization message is transmitted over every RF channel, that is, at least once/$T_{hop}$ (i.e., one per channel). It is noted that the synchronization messages are only transmitted on the channels in the hop sequence wherein the units are at during the transmission. For example, if there is a 100-channel plan and the transmission session spans hop indices 3, 4, and 5, the transmission are only performed on channels for hop index 3, 4, and 5, but not on all the 100 channels. The period $T_{sync}$ is selected so that all channels in the hop sequence are and can be used for resynchronization once before any repeated channel usage occurs. This ensures that interference on some individual channel or set of channels does not systematically cause resynchronization to fail or take longer. Rather, these interference effects average out over time. One way of doing this is to use a prime number of channels in the hop sequence, and set $T_{sync}=N*T_{hop}$, where N is a positive number. In an exemplary embodiment of the present invention, the time period of $T_{sync}$ can be, for example, about 1 second for 100 frames.

In addition to the Link_Check_req commands, base unit 10 further transmits another link synchronization message, Link_confirm_req command, to portable unit 20 after transmitting a number of Link_Check_req commands, for example, every M synchronization periods. This Link_Confirm_req command requires a reply from portable unit 102 to make sure that system 100 is still in synchronization. Base unit 10 does subsequent synchronization transmissions of this message until it receives a reply from portable unit 20. Once base unit 10 receives the reply, it resets a counter so that in the following M−1 synchronization periods, base unit 10 again transmits Link_Check_req messages that does not require a reply from portable unit 20. In the case that the synchronization period is about 1 seconds and $T_{sync}$ is about 10 seconds, base unit 10 transmits a Link_confirm_req command after it transmits Link_Check_req commands for nine periods (i.e., M=10). Both the Link_Check_req and Link_Confirm_req commands are transmitted with two index counters that indicate which transmission is taking place. The first index counter X corresponds to the packet number within a transmission burst. The second index counter Y corresponds to the ordinality of that instance of the RESYNC state. Counter X is reset on any entry to the RESYNC state, and counter Y is reset once base unit 10 does a successful link confirm, i.e., base unit 10 sends Link_Confirm_req command to portable unit 20 and hears Link_Confirm_Reply command from portable unit 20. In addition to being helpful during debugging, these counters may be used by portable unit 20. As there is exactly 1 second (100 frames) between successive transmissions of Link_check_req, by looking at counter X, portable unit 20 knows how long to set its next wakeup timer to wake up at the correct time for the next link check. Counter Y is used by portable unit 20 to decide how long it should listen for RESYNC message, and how long it should transmit Link_Confirm_Reply.

Portable unit 20 must reply to the Link_Cofirm_req command. If base unit 10 fails to receive the Link_Confirm_reply command within expected number of periods, base unit 10 starts searching for a synchronized communication channel. Similarly, if portable unit 20 fails to hear the Link_Confirm_req within an expected number of periods, portable unit 20 also start searching a synchronized communication channel.

Portable unit 20 also turns on receiver 22 with the period $T_{sync}$. After being turned on, receiver 22 of portable unit 20 tunes to an expected transmission channel of base unit 10 some time $t_{offset}$ prior to the expected time of transmission from base unit 10, as shown in FIG. 5. The offset time $t_{offset}$ is less than $T_{hop}$, and is selected to ensure that base unit 10 transmission on the expected resynchronization channel falls within the time that portable unit 20 will be able to decode it on that channel, thus allowing for clock inaccuracy in either direction. Normally, during the ACQUIRED SLEEP state, an Application-Specific Integrated Circuit ("ASIC") of portable unit 20 is likely to be in the standby mode. When it is the time for portable unit 20 enters the RESYNC state, portable unit 20 is woken by the wakeup timer. If it is woken out of the standby mode by a stimulus (e.g., a keypress) other than the wakeup timer, the ASIC stays awake and processing, but the MAC state is still SLEEP and transits to the RESYNC state when the expected wakeup timer interrupt arrives.

Before portable unit 20 exits from its SLEEP state, it determines the expected wakeup interrupt time by reading a timer that is configured for the sleep mode, calculating the number of ms remaining until an expected wakeup time $t_{nw}$, and then counting down the number of 1 ms time-slices until that time arrives (i.e., $t_{nw}=0$). Portable unit 20 can also tracks its expected time until next wakeup time, $t_{nw}$, as it awaits a message, for example the Link_check req commands, from base unit 10. Receiving such a message causes portable unit 20 to adjust its $t_{nw}$, such that a next wakeup time will bear the expected timing relation to the transmission of base unit 10. Otherwise, the adjustment of $t_{nw}$ is done only as timekeeping, i.e., decremented with a clock. Hence, receipt of this synchronization message allows portable unit 20 to adjust its timing. Portable unit 20 does not need an accurate clock in its low-power standby mode. The clock only needs to be accurate enough to ensure that wakeup occurs within the correct $T_{hop}$, so that portable unit 20 will be on the correct channel and can hence successfully receive a transmission from base unit 10 at an expected wakeup time.

In one embodiment of the present invention, if portable unit 20 fails to detect a transmission from base unit 10 in the first $T_{hop}$ of this wakeup session, it tunes its receiver to the next frequency in the hopping sequence, it does so for J frequency hops, where $J \geq 0$. If it does not detect any transmission from portable unit 20 in this time, it may go back to its lower power mode until the next scheduled wakeup when tnw=0, or it may take some other action.

In one exemplary embodiment of the present invention, at base unit 10, the RESYNC state lasts for about 40-100 ms, depending on transmissions and packets received. On portable unit 20, the RESYNC state lasts typically for 15-100 ms, again depending on transmission required and packets received. Portable unit 20 also stays in its RESYNC state once it has completed its link check but not yet been given permission to sleep by the power manager. However, its RF circuitry is disable in this case, so from a link behavior point of view, this part of RESYNC state is indistinguishable from its SLEEP state.

Figure 6:
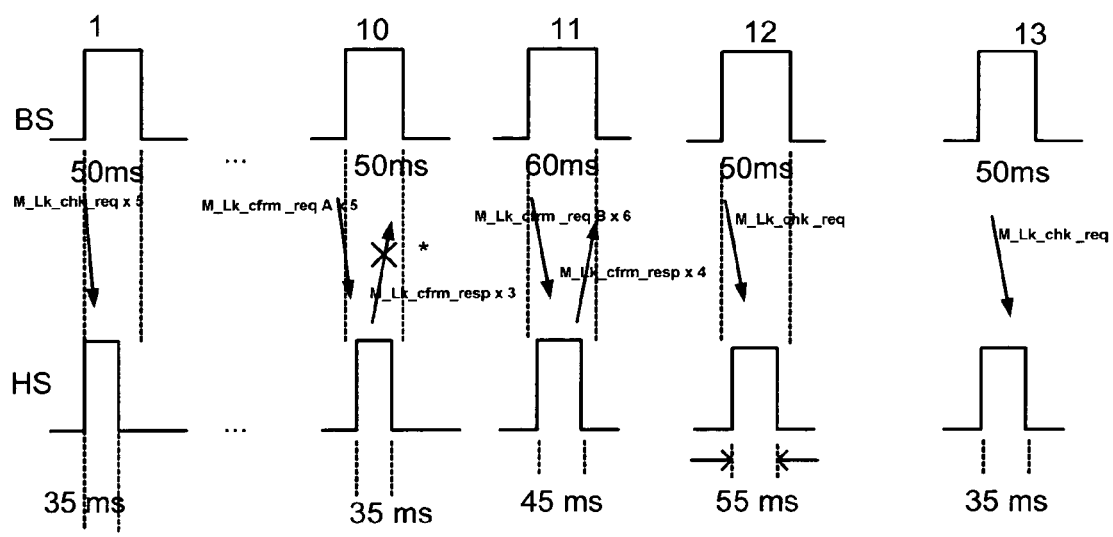
FIG. 6 is an exemplary timing diagram in accordance with the present invention that shows a successful resynchronization between a portable unit and a base unit.
Figure 7:
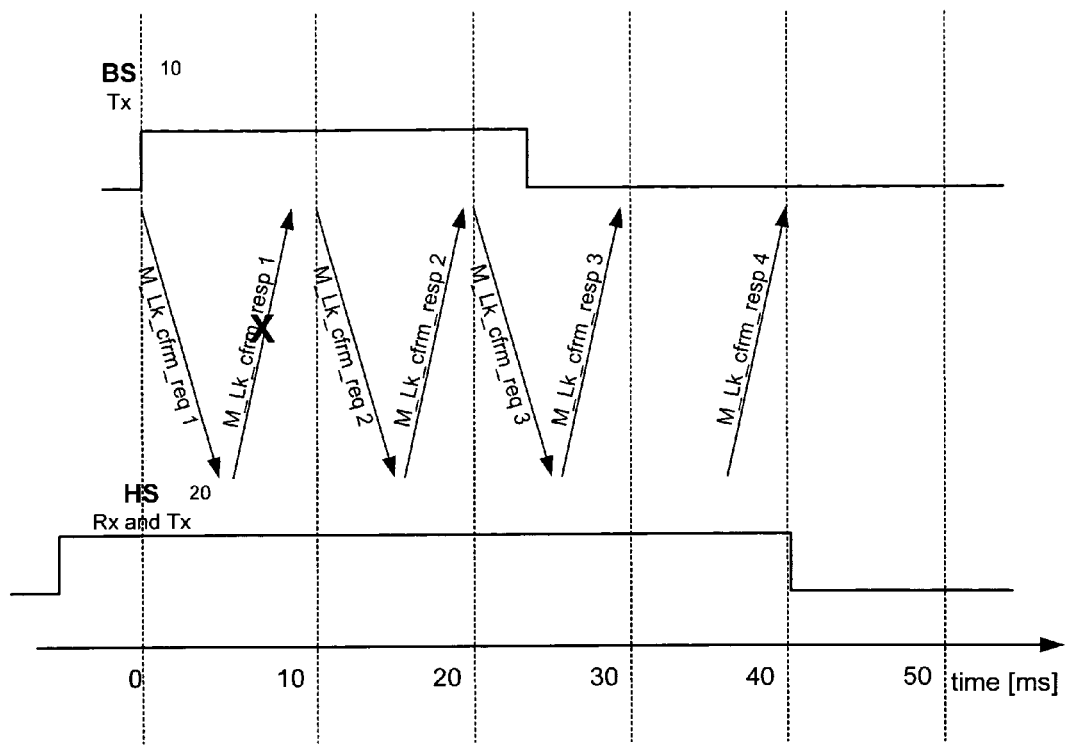
FIG. 7 is a more detailed timing diagram of FIG. 6.
Figure 8:
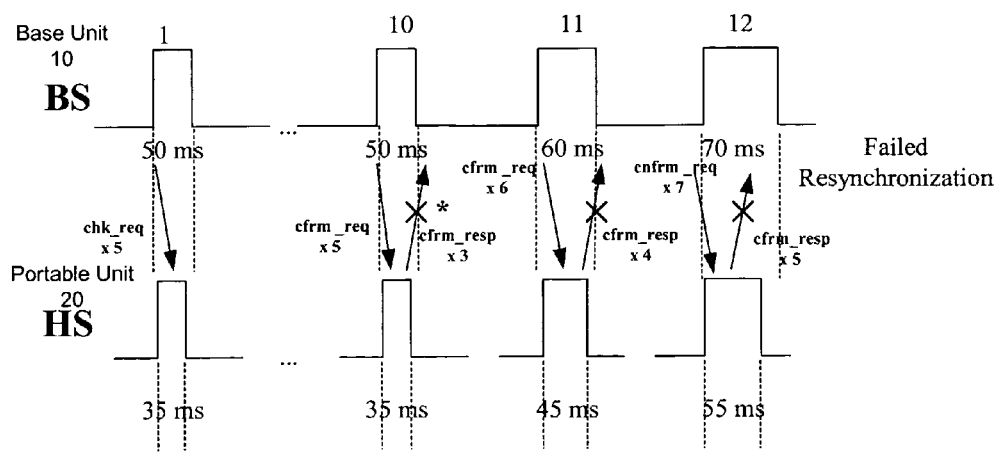
FIG. 8 is an exemplary timing diagram in accordance with the present invention that shows an unsuccessful resynchronization between a portable unit and a base unit.

FIGS. 6-8 show various examples of successful and unsuccessful resynchronization at the RESYNC state. In these illustrated examples, it is assumed that base unit 10 and portable unit 20 transmit to their RESYNC state every one second. It is further assumed that base unit 10 transmits a Link_Check_req command five times to portable unit 20 in every period (every one second), and transmits a Link_Confirm_req command five times to portable unit 20 in every tenth periods (i.e., every ten seconds). That is, base unit 10 transmits the Link_Check_req commands at periods 1-9 and transmits the Link_Confirm_req command at period 10.

The period number of the Link_Check_req is sent as part of Link_Check_req argument (i.e., index counter Y), so that portable unit 20 knows how many Link_Check_request commands have been transmitted, even if portable unit 20 has not heard all of them. As described above, portable unit 20 need not respond to these commands, but it is able to detect them. After portable unit 20 detects the Link_Check req command, it goes to sleep to conserve battery power. Otherwise, it stays awake until it detects the command or the portable unit resynchronization timer times out.

Furthermore, the Link_Check_req commands transmitted by base unit 10 may contain a timing clock of base unit 10 so that after receiving the Link_Check_req commands, portable unit 20 can adjust its timing clock based on the base timing clock contained in the commands. The timing clock, in one embodiment of the present invention, may be a function of a frequency in the frequency hop sequence at any given time. Any transmission by base unit 10 may contain its bit timing, and portable unit 20 recovers the bit timing by the action of decoding the transmission. The value X that is transmitted with Link_Check_Req serves as a check that portable unit 20 and base unit 10 agree on the position within the hop sequence. For example, assume that there is a hop sequence with 101 channels and the synchronization period $T_{sync}=950$ ms=95 frames. Suppose that base unit 10 and portable unit 20 enters the SLEEP state at hop index 0 and $S_{ync}=95$ frames. Thus, the first Link_Check_Req transmission, with X=0, will happen on hop index 95. So if portable unit 20, during the wakeup sequence, receives a command Link_Check_Req with X=2, then it means that the command should be, or presumably is, received on hop index 97. In this manner, base unit 10 and portable unit 20 align and adjust their timing clock to ensure their synchronization.

For example, in an exemplary embodiment shown in FIGS. 6-8, base unit 10 transmits Link_Check_req commands for 50 ms for periods 1-9 inclusive. In every period, portable unit 20 wakes up for 35 ms to listen for a Link_Check_req command. If portable unit 20 hears a Link_Check_req prior to the time out, it turns its receiver off and goes back to sleep and decrements. When the counter of portable unit 20 decrements to zero (for example, at period 10), which means that it is the time for base unit 10 to transmit a Link_Confirm_req command and portable unit 20 will wake up at period 10 for 35 ms, as usual, to listen for the Link_Confirm_req command. If portable unit 20 hears the command, it replies a Link_Confirm_reply command to base unit 10. In the present invention, as portable unit 20 does not know if base unit 10 has received and recognized its reply command until it receives a Link_Check req commands from base unit at the next period (i.e., period 11), it increments its wakeup time by one frame (i.e., 10 ms) for the next wakeup period, making the wakeup duration of period 11 be 45 ms, regardless of whether it receives a Link_Confirm_req command from base unit 10 at period 10 or not. If portable unit 20 does hear one Link_Check_req command at period 11, it resets it wakeup time for a next wakeup period (i.e., period 12) back to 35 ms. Handset receiver wakeup duration represents the maximum length of time that the handset has the receiver on. It is noted that even if portable unit 20 has heard the Link_Confirm_req command, there is a uncertainty that base unit 10 has received a reply command from portable unit 20. Only if portable unit 20 receives a Link_Check_req command at the next period, portable unit 20 ascertains that base unit 10 has received and recognized its reply. Portable unit 20 then resets its wakeup duration back to 35 ms and expects to receive a Link_Check_req command at next wakeup time.

FIG. 6 shows a successful resynchronization between portable unit 20 and base unit 10 after an initial failure.

At resynchronization period 1, portable unit 20 listens for transmission from base unit 20, up to a maximum of 35 ms. As mentioned above, a resynchronization period is set to 10 seconds. Therefore, at synchronization period 10, base unit 10 transmits a Link_Confirm_request command to portable unit 20 for 50 ms. Portable unit 20 should respond to this command by transmitting a Link_Confirm_reply command to base unit 10 within this period. However, in this case, base unit 10 does not receive the Link_Confirm_reply from portable unit 20 before the end of period 10. Therefore, from the point of view of portable unit 20, the link confirmation is successful, but from the point of view of base unit 10, the link confirmation is not successful. Accordingly, there is a need to repeat resynchronization attempt.

At synchronization period 11, as base unit 10 fails in its first link confirmation request, base unit 10 sends another Link_Confirm_req command to portable unit 20 in period 11. To increase the probability of a successful transmission/reception of link confirm packets, base unit 10 lengthens its transmission time by one frame, i.e., period 11 has a period of time of 60 ms at base unit 10 side. Furthermore, as portable unit 20 does not know whether base unit 10 receives its reply in the last link confirmation period, portable unit 20 also lengthens its listening time by one frame, making it to be 45 ms. In this case, portable unit 20 receives and recognizes the second Link_Conform_req sent by base unit 10 in period 11 and responds with a Link_Confirm_reply command. Base unit 10 also receives and recognizes the Link_Confirm_reply before the end of period 11, a resynchronization is considered being successfully completed. There is no more Link_Confirm_req required to be sent from base unit 10 to portable unit 20. Base unit 10, therefore, goes to its IDLE state.

At synchronization period 12, as base unit 10 is successful in synchronization period 11, base unit 10 resets its counter X to 1, recovers the time duration of synchronization period 12 to 50 ms, and transmits a Link_Chek_req command to portable unit 20. However, as described above, as portable unit 20 does not know if base unit 10 has received its reply, it increments another frame to period 12, resulting that period 12 has a wakeup duration of 55 ms. If portable unit 20 receives a Link_Check_req command in period 12, portable unit 20 realizes that the link confirmation has been successful. Portable unit 20, therefore, resets its counter X to 1, enters into its SLEEP state in period 12 to save its battery power and resets its wakeup duration of period 13 to 35 ms.

FIG. 7 is a detailed diagram of the resynchronization procedure of FIG. 6 at period 11. In this figure, it can be seen that the width of a successful RESYNC period of base unit 10 can be less than 60 ms that corresponds to a maximum duration of base unit 10. Once base unit 10 receives and successfully processes a Link_Confirm_reply from portable unit 20 (such as at the location of 20 ms), base unit 10 exits its RESYNC state and stops further transmissions of the. Link_Confirm_req commands. However, as portable unit 20 does not know that base unit 10 has received and processed the Link_Confirm_reply command, it continues sending the Link_Confirm_reply commands throughout its fully resynchronization duration of 45 ms.

FIG. 8 shows an unsuccessful resynchronization example between portable unit 20 and base unit 10. In this figure, as the procedures of periods 1-9 are the same as those and have been described in FIG. 6, their descriptions are omitted here.

In period 10, it is assumed that base unit 10 sends Link_Confirm_req commands 5 times, and portable unit 20 has its receiver on for three of these five Link_Confirm_req messages. If handset 102 does not receive the Link_Confirm_req message, there will be no expected Link_Confirm_reply message, and the resynchronization will fail for the period 10.

Since the resynchronization in period 10 is not successful, there is a need to repeat an attempt, as illustrated in period 11 of FIG. 8. Similarly, if portable unit 20 fails to receive the Link_Confirm_req or base unit 10 fails to receive a Link_Confirm_reply before the end of period 11, this second resynchronization attempt has again failed. In accordance with one embodiment of the present invention, there are three attempts of resynchronization. The number of attempts, however, is a design decision based on the expected bit error rate and how much the timing slave can slip relative to the timing master. In the case of three attempts, base unit 10 will transmit a Link_confirm_req again in period 12 for a third attempt. As described above, the transmission duration of base unit 10 and the wakeup duration of portable unit 20 at period 12 are each incremented with one frame, i.e., 70 ms and 55 ms, respectively, as shown in FIG. 8. In period 12, if base unit 10 does not receive the Link_Confirm_req message again, base unit 10 assumes that the resynchronization procedure is failed and starts its SEARCH state at the end of period 12. Similarly, if portable unit 20 does not receive a Link_Check_req in period 13, portable unit 20 also assumes that the resynchronization procedure is failed and starts its SEARCH state at the end of period 13.

Figure 9:
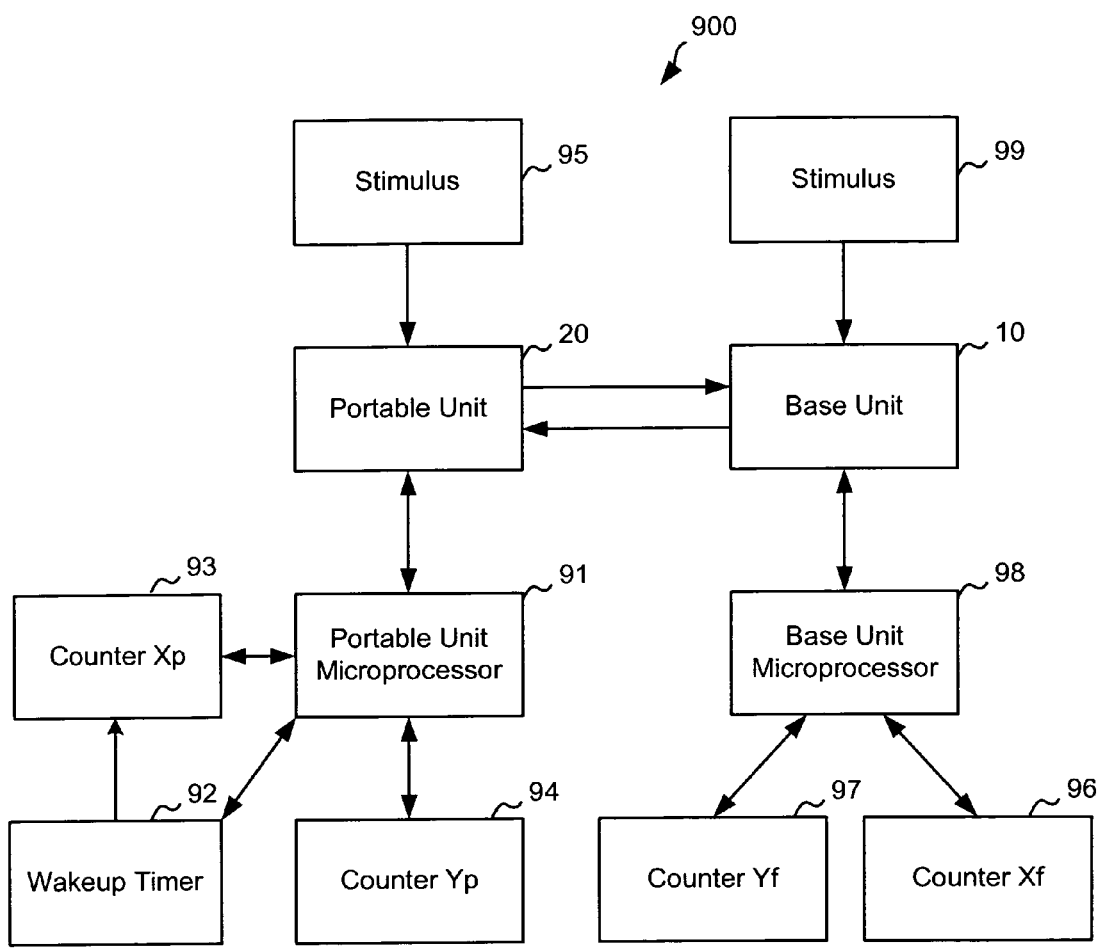
FIG. 9 is a schematic diagram of an exemplary system for maintaining synchronization between base unit 10 and portable unit 20 in a standby mode in accordance with the present invention.

FIG. 9 is an exemplary embodiment of a system for maintaining synchronization between portable unit 20 and base unit 10 of cordless telephone system 900 that employs a frequency hopping link in accordance with the present invention. System 900 includes microprocessors 98 and 91, which are used with base unit 10 and portable unit 20, respectively, for controlling the synchronization between base unit 10 and portable unit 20. Microprocessors 98 and 91 may employ the protocol as illustrated in FIG. 2 that has been described above to manage the resynchronization process of the state machines of base unit 10 and portable unit 20. Therefore, the details of microprocessors 91 and 98 are omitted herein.

In addition to microprocessors 91 and 98, system 900 includes, at portable unit 20 side, wakeup timer 92 for providing wakeup signals to portable unit 20, counter $X_p$ 93, and counter $Y_p$ 94. System 900 also includes, at base unit 10 side, counter $X_f$ 96 and counter $Y_f$ 97. As described above, counters $Y_p$ and $Y_f$ are the ordinality of the RESYNC state entry, which starts at 1 and is incremented by 1 with each link check (i.e., RESYNC state entry) and reset to 0 by successful completion of a link confirm request/link confirm reply. Counters $X_p$ and $X_f$ correspond to the packet number with a transmission burst, which starts at M, for example, and is decremented by 1 from its value M every time when portable unit 20 is woken up by wakeup timer 92. At the SYNC state, base unit 10 transmits a Link_Check_req command in every synchronization period until the value of counter 93 becomes zero, i.e., base unit 10 transmits the linking checking commands for (M−1) periods, and then transmits a Link_Confirm_req command at M-th period to portable unit 20. At the time, the value of counter 93 is reset to M again and the value is decremented by one when portable unit 20 is again woken up by wakeup timer 92.

According to system 900, during a low-power mode, microprocessors 98 and 91 switch base unit 10 and portable unit 20 from their respective IDLE state and SLEEP state to the RESYNC state at every resynchronization period $T_{sync}$. In the RESYNC state, portable unit 20 is woken up by wakeup timer 92 on a regular basis if no interrupts occur during the low-power mode. Portable unit 20 can also be woken up by stimulus 95 occurring at portable unit 20 side by, for example, a keypress. Moreover, portable unit 20 can be woken up by a TRACK state command sent by base unit 10 when base unit 10 receives stimulus 99 by, for example, a ringing signal. In either situation, wakeup timer 92 of portable unit 20 will check its timer and calculating the next wakeup time before portable unit 20 leaves its SLEEP state. In this manner, if portable unit 20 is woken up by stimulus 95 or the TRACK state command from base unit 10 at a time rather than a regular wakeup time, wakeup timer 92 will re-set a next wakeup time for portable unit 20 to extend from the time that portable unit 20 is woken by stimulus 95. For example, if a regular wakeup period is 1 second and portable unit 20 is woken up by stimulus 95 at the time of 30 ms, portable unit 20 will set up wakeup timer 92 such that a wakeup time starts at RESYNC state, with a transmission request active, at t=1000 ms, or 970 ms after the wakeup stimulus had occurred.

In operation, microprocessor 91 of portable unit 20 keeps track of, and acts on its local version of counters $X_p$ and $Y_p$. Similarly, microprocessor 98 of base unit 10 keeps track of, and acts on its local version of counters $X_f$ and $Y_f$. In normal operation, counter $X_p$ should agree with $X_f$, and $Y_p$ should agree with $Y_f$. However, in some cases, counters $X_p$ and $Y_p$ may not agree with counter $X_f$ and $Y_f$ if, for example, portable unit 20 does not know if its link confirm reply has been received by base unit 10.

The parameter X and Y are transmitted across the link with each link check packet, link confirm packet and link confirm reply packet. Base unit 10 transmits $X_f$ and $Y_f$ and portable unit 20 transmits $X_p$ and $Y_p$. Assuming that the counters at both of base unit 10 side and portable unit 10 side count properly, portable unit 20 knows when the parameter X has wrapped around to 1 by the simple fact of receiving a Link_Check_Req command after having received a Link_Confirm_Req.

As described with reference to FIGS. 6-7, at the SYNC state, base unit 10 and portable unit 20 need to send several link check, link confirm and link confirm reply packets, e.g., Link_Chek, Link_Confirm_Req, and Link_Confirm_Reply commands, to each other commands to ensure and adjust their synchronization. As these transmissions of the commands have been described above, the descriptions thereof are omitted herein.

Figure 10:
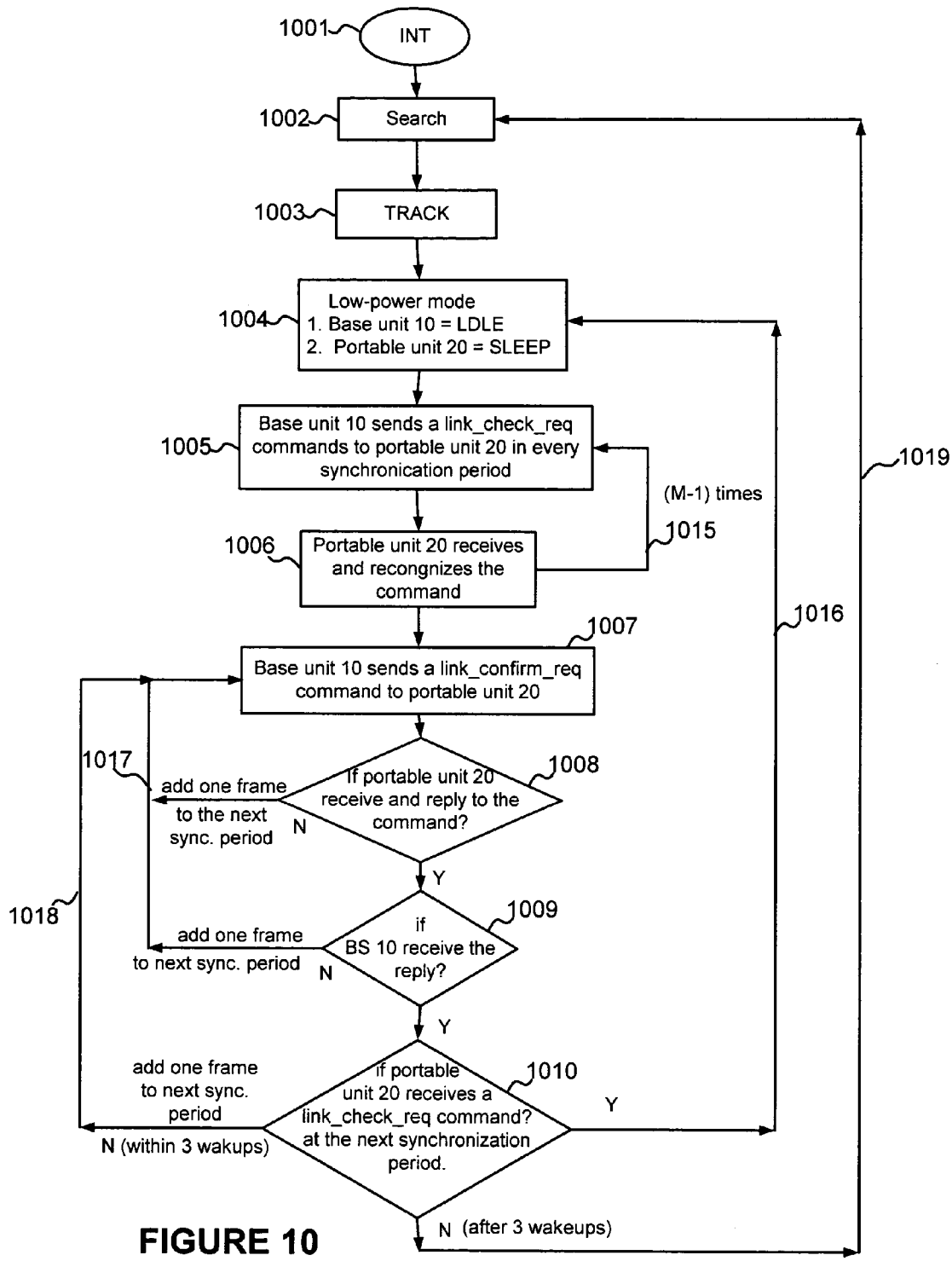
FIG. 10 is a flow chart illustrating a resynchronization method between a portable unit and a base unit of a cordless telephone system that employs a frequency-hopping link in accordance with the present invention.

FIG. 10 is a flowchart showing a method for maintaining synchronization between base unit 10 and portable unit 20 of a cordless telephone system that employs a frequency hopping communication technology in a low-power mode in accordance with the present invention.

Steps 1001 and 1002 show that when the cordless telephone system is turned on (step 1001), base unit 10 and portable unit 20 first enter the Search state to search for an synchronized communication channel (step 1002). The searching process has been described with reference to FIGS. 3 and 4, in which portable unit 20 searches for a SYNC word in signals received from base unit 10. When the SYNC word is found, that is, a synchronized communication channel is found, base unit 10 and portable unit 20 then enter into the TRACK state, as shown in step 1003. At the TRACK state, base unit 10 and portable unit 20 maintain their synchronization by transmitting a synchronization signal in both direction in a frequency hopping link.

In one embodiment of the present invention, when receiving the synchronization signal from base unit 10, portable unit 20 adjusts its timing clock based on the timing clock of the base unit contained in the synchronization signal.

At step 1003, if base unit 10 and portable unit 20 need not transmit data or audio signals, base unit 10 and portable unit 20 then enter into the standby mode, as shown in step 1004.

At step 1004, base unit 10 enters into the IDLE state. Portable unit enters into the SLEEP state when it receives a permission from its power manager (i.e., MAC layer 202 of FIG. 2). Accordingly, the cordless telephone system is now at a low-power mode. In the low-power mode, base unit 10 and portable unit 20 both turn off their transmitters and receivers to save the power. As the transmitters and receivers of portable unit 20 and base unit 10 are turned off, the synchronization between base unit 10 and portable unit 20 would be lost somehow due to such as signal interference, frequency differences, system clock drift, etc. Therefore, it is important to carry out a resynchronization process in a regular basis in the standby mode.

At step 1005, during the standby mode, base unit 10 and portable unit 20 switch to the SYNC state periodically, for example, every 1 second, for performing the resynchronization process. During every resynchronization period, base unit 10 transmits at least one link synchronization message, such as the Link_Check_req command or the Link_Confirm_req command to portable unit 20. As described above, portable unit 20 may be woken up by a wakeup timer slightly earlier than an expected time of a transmission of the link synchronization message from base unit 10 to allow the link synchronization message falls within an expected resynchronization channel.

In accordance with the present invention, base unit 10 continuously transmit the Link_Check_req commands for (M−1) synchronization periods, as shown by arrow 1015. Portable unit 20 needs not to respond to the Link_Check_req commands. As shown at step 1006, portable unit 20 only needs to adjust its timing clock to be aligned with the timing clock of base unit 10.

At step 1007, after transmitting the Link_Check_req commands at the (M−1) periods, base unit 10 transmits the Link_Confirm_req command at the M-th period, asking for a reply from portable unit 20 to ensure that a synchronization with portable unit 20 still exists.

At steps 1008 and 1009, if portable unit 20 receives the Link_Confirm_req and replies to it (step 1008), and base unit 10 receives a Link_Confirm_reply from handset 20 before the end of the M-th period (step 1009), a successful resynchronization process is completed. In accordance with the present invention, base unit 10 goes back to the low-power mode when it receives the Link_Confirm_reply from portable unit 20, as shown by arrow 1016. Counter $Y_f$ of base unit 10 is reset to 0. Base unit 10 then transmits a new Link_Check_Req command to portable unit 20 at the (M+1) period.

At step 1010, after receiving the new Link_Check_Req command from base unit 10 at the (M+1) period, which confirms that a resyrichronization process is successfully performed, portable unit 20 then also enters into the low-power mode, as shown by arrow 1016.

In accordance with the invention, portable unit 20 does not know if base unit 10 has received its reply after it sends a link confirm reply command to base unit 10. Therefore, the result of step 1010 provides an indication to portable unit 20 whether a resynchronization process is successfully completed. That is, at step 1010, if portable unit 20 receives a Link_Check_Req command from base unit 10 after it sends the reply command to base unit 10 at the beginning of a next synchronization period, it indicates that base unit 10 has received its reply and a resynchronization process is successfully performed before the end of a previous synchronization period. Therefore, portable unit 20 enters its low-power mod, i.e., SLEEP state, as shown by arrow 1016. If at step 1010, portable unit 20 receives a Link_Confirm_Req command from base unit 10 after it sends the reply command to base unit 10, it indicates that a resynchronization process is not successfully performed. The flow chart then return to step 1007, as shown by arrow 1018. In accordance with one embodiment of the present invention, the resynchronization process, if failed, can be retried three times. If no resynchronization is completed after these three tries, base unit 10 and portable unit 20 both enter the SEARCH mode to search for an available communication channel, as shown by arrow 1019.

Referring again to steps 1008-1010, if either portable unit 20 does not receive the Link_Confirm_reply commands from base unit 10 and reply (step 1008), or the Link_Confirm_reply command from portable unit 20 does not reach base unit 10 before the end of the M-th period (step 1009), the resynchronization process is deemed failed. Accordingly, the flow chart goes to step 1007, as shown by arrows 1017 and 1018. Base unit 10 then transmit another Link_Confirm_req command to handset 20 at a next period, i.e., the (M+1)-th period, and the flow chart repeats steps 1008-1010, as described above.

Furthermore, at steps 1017 and 1018, to ensure that there is enough time for base unit 10 and portable unit 20 to transmit and receive communication messages, the time duration of the (M+1) period for both base unit 10 and portable unit 20 is increased by, for example, 1 frame. As described above, the increase of the time duration of the (M+1) period is controlled and managed by the protocol of FIG. 2 (i.e., protocol 91 of FIG. 9.)

Similarly, at steps 1008-1010, if portable unit 20 receives the Link_Confirm_req command and responds to the commands by sending out the Link_Confirm_reply command (step 1008), base unit 10 receives the reply commands before the end of the (M+1)-th period (step 1009), and portable unit 20 receives a new Link_Check_Req command from base unit at a next period, i.e., the (M+2)-th period (step 1010), the resynchronization process is deemed successful. Base unit 10 and portable unit 20 are then entering into the low-power mode of step 1004.

In the same manner, if portable unit 20 still does not receive the second Link_Confirm_req command or base unit 10 does not receive a reply command from handset 20 at the end of the (M+1)-th period, the resynchronization process is deemed unsuccessful. In accordance with one embodiment of the present invention, base unit 10 is given a third chance to re-send a third Link_Confirm_req command at (M+2)-th period, and the time of duration of the (M+2) period is again increased by, for example, one more frame.

At the last try, at step 1010, if base unit 10 finally receives a reply command from handset 20 before the end of the (M+2)-th period, base unit 10 deems the resynchronization process successful and then switches back to the low-power mode. Portable unit 20 also deems the resynchronization process successful when it receives a new Link_Check_Req command from base unit 10 at the beginning of the (M+3) period. Portable unit 20 then adjusts its resynchronization time window and counter and then switches back to the low-power mode. Otherwise, base unit 10 and portable unit 20 switch to the SEARCH state to re-start a search for a synchronized communication channel, as shown by arrow 1019. If portable unit 20 does not receive a new Link_Check_Req command at the beginning of the (M+3) period, portable unit 20 would continue cycling through RESYNC/ACQUIRE SLEEP until it misses enough base transmission to trigger its channel search criteria.

In accordance with the present invention, after base unit 10 receives a reply commands from portable unit 20 in either periods M, M+1, or M+2, base unit 10 enters into the IDLE state. Portable unit 20, however, has to wait until it receives a Link_Check req command at (M+3)-th period, which means that base unit 10 has received and recognized its reply command and a successful synchronization process is completed. Portable unit 20 is then entering into its SLEEP state. In an alternative embodiment, portable unit 20 further has to wait for a permission from the energy manager before entering into the SLEEP state.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for maintaining synchronization of a base unit and a portable unit in a standby mode over a frequency-hopping radio link comprising:

transiting the base unit and the portable unit to a resynchronization state during the standby mode in a resynchronization period, wherein the resynchronization period is a product of a positive number and a period of time of frequency hopping on each channel of multiple communication channels that are used by the base unit and the portable unit for communications;

transmitting at least one link synchronization message from the base unit to the portable unit at every resynchronization period;

adjusting a timing clock of the portable unit based on the at least one synchronization message received from the base unit;

responding to the at least one link synchronization message when required by the base unit; and after receiving the response to the at least one link synchronization message, transiting the base unit and the portable unit from the resynchronization state to a low-power state, wherein the link synchronization message is one of a link synchronization checking message and a link synchronization confirmation message, and wherein the link synchronization confirmation message requires a response from the portable unit, the method further comprising transmitting the link synchronization checking message for (M−1)synchronization periods and a first link synchronization confirmation message at M-th period, wherein M is an integer greater than 2.

2. The method of claim 1, wherein during the low-power state, the base unit is at an IDLE state and the portable unit is at a SLEEP state.

3. The method of claim 1, further comprising transiting the base unit and the portable unit to a Search state for searching for a synchronized channel among the multiple channels when the base unit fails to receive a response from the portable unit after a predetermined number of link synchronization periods.

4. The method of claim 3, wherein the predetermined number of link synchronization periods is three.

5. The method of claim 1, wherein the base unit transits to the low-power state upon a receipt of the response to the first link synchronization confirmation message from the portable unit at the M-th period.

6. The method of claim 5, wherein the portable unit transits to the low-power state upon a receipt of a link synchronization checking message at (M+1)-th period.

7. The method of claim 1, further comprising transmitting a second link synchronization confirmation at (M+1)-th period when the base unit does not receive a response to the first link synchronization confirmation message from the portable unit at the end of the M-th synchronization period.

8. The method of claim 7, further comprising increasing a time duration of the (M+1)-th period for Y more frames than a time duration of the M-th period, wherein $Y \geq 1$.

9. The method of claim 7, wherein the base unit transits to the low-power state upon a receipt of the response to the link synchronization confirmation message from the portable unit at the (M+1)-th period, and the portable unit transits to the low-power state upon a receipt of a link synchronization checking message at (M+2)-th period.

10. The method of claim 7, further comprising transmitting a third link synchronization confirmation at (M+2)-th period when the base unit does not receive a response to one of the first and second link synchronization confirmation messages from the portable unit at the end of the (M+2)-th synchronization period.

11. The method of claim 10, further comprising increasing a time duration of the (M+2)-th period for Z more frames than the M-th period, wherein $Z \geq 2$.

12. The method of claim 10, wherein the base unit transits to the low-power state upon a receipt of the response to the link synchronization confirmation message from the portable unit at the (M+2)-th period, and the portable unit transits to the low-power mode upon a receipt of a link synchronization checking message at (M+3)-th period.

13. A system for maintaining synchronization of a base unit and a portable unit in a standby mode over a frequency-hopping radio link, wherein the base unit and the portable unit communicate with each other via a wireless frequency hopping communications radio link, the system comprising:

a first and a second processor for switching the base unit and the portable unit, respectively, to a synchronization state in a synchronization.period, wherein the second processor sends a wakeup signal to the portable unit substantially at the time when switching to the synchronization state occurs;

a first transmitter located in the base unit for transmitting a link synchronization message to the portable unitduring the synchronization period; and a second transmitter located in the portable unit for sending a link synchronization reply message to the base unit when required by the base unit, wherein the first processor and the second processor switch the base unit and the portable unit, respectively, to a 1ow-power state if the base unit receives the link synchronization reply message within X synchronization periods, wherein X is an integer greater than 1, wherein the link synchronization message sent by the base unit comprises one of a link synchronization checking message and a link synchronization confirmation message and the link synchronization reply message is responsive to the link synchronization confirmation message, wherein the first transmitter transmits the link synchronization confirmation message no greater than three times, wherein the first transmitter transmits a first link synchronization confirmation message at M-th period, and transmits a second link synchronization confirmation message at (M+1)-th period to the portable unit if the base unit does not receive the link synchronization reply message from the portable unit by the end the M-th period wherein M is an integer greater than zero.

14. The system of claim 13, wherein the first processor further switches the base unit to a Search state for searching for a synchronized communication channel when the base unit does not receive the link synchronization reply message from the portable unit within the X synchronization periods.

15. The system of claim 13, wherein the second processor further switches the portable unit to a Search state for searching for a synchronized communication channel when the portable unit fails to receive a link synchronization checking message from the base unit after the portable unit sends the link synchronization reply message to the base unit.

16. The system of claim 15, wherein the first transmitter of the base unit transmits the link synchronization checking message at least once.

17. The system of claim 13, wherein the second processor sends the wakeup signal to the portable unit a preset period of time before the base unit and the portable unit are switched to the synchronization state, wherein the preset period of time is less than a duration of every synchronization period.

18. The system of claim 13, wherein the processor increases a wakeup time duration of the (M+1)-th by Y frames, wherein Y is an integer no less than 1.

19. The system of claim 13, wherein the first transmitter of the base unit transmits a third link synchronization confirmation message at (M+2)-th period to the portable unit, when the base unit does not receives the link synchronization reply message from the portable unit by the end the (M+1)-th period.

20. The system of claim 19, wherein the second processor increases a wakeup time duration of the (M+2)-th period by Z frames, wherein Z is an integer no less than 2.

* * * * *